(12) United States Patent
Kumar et al.

(10) Patent No.: US 10,795,643 B2
(45) Date of Patent: Oct. 6, 2020

(54) SYSTEM AND METHOD FOR RESOURCE RECONCILIATION IN AN ENTERPRISE MANAGEMENT SYSTEM

(71) Applicant: BMC SOFTWARE, INC., Houston, TX (US)

(72) Inventors: Narayan Kumar, Santa Clara, CA (US); Douglas Mueller, Palo Alto, CA (US); Richard Mayfield, Pleasanton, CA (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 15/476,704

(22) Filed: Mar. 31, 2017

(65) Prior Publication Data

US 2017/0206061 A1    Jul. 20, 2017

Related U.S. Application Data

(63) Continuation of application No. 14/851,899, filed on Sep. 11, 2015, now Pat. No. 10,534,577, which is a
(Continued)

(51) Int. Cl.
*G06F 7/32* (2006.01)
*G06F 7/20* (2006.01)
(Continued)

(52) U.S. Cl.
CPC .................. *G06F 7/32* (2013.01); *G06F 7/14* (2013.01); *G06F 7/16* (2013.01); *G06F 7/20* (2013.01);
(Continued)

(58) Field of Classification Search
CPC ............... G06F 17/14; G06F 17/30312; G06F 17/3053; G06F 17/30; G06F 7/14; H04L 41/0813; H04L 41/0893; H04L 41/08
(Continued)

(56) References Cited

U.S. PATENT DOCUMENTS 5,761,505 A     6/1998  Golson et al.
5,946,681 A  *  8/1999  Shorter ................. G06F 16/215
(Continued)

OTHER PUBLICATIONS

Final Office Action for U.S. Appl. No. 13/082,194, dated Mar. 28, 2017, 70 pages.
(Continued)

*Primary Examiner* — Hosain T Alam
*Assistant Examiner* — Tracy M McGhee
(74) *Attorney, Agent, or Firm* — Brake Hughes Bellermann LLP

(57)  ABSTRACT

A method to reconcile multiple instances of a single computer resource identified by resource discovery operations includes: (1) accessing information describing one or more resources; (2) identifying, via the accessed information, at least one resource that has been detected or discovered by at least two of the discovery operations; and (3) merging attributes associated with the identified resource from each of the at least two discovery operations into a single, reconciled resource object. Illustrative "resources" include, but are not limited to, computer systems, components of computer systems, data storage systems, switches, routers, memory, software applications (e.g., accounting and database applications), operating systems and business services (e.g., order entry or change management and tracking services).

22 Claims, 9 Drawing Sheets

Related U.S. Application Data continuation of application No. 11/204,189, filed on Aug. 15, 2005, now Pat. No. 9,137,115.

(60) Provisional application No. 60/633,640, filed on Dec. 6, 2004.

(51) Int. Cl.
*G06F 7/14* (2006.01)
*G06F 7/36* (2006.01)
*G06F 16/22* (2019.01)
*G06F 16/2457* (2019.01)
*H04L 12/24* (2006.01)
*G06F 7/16* (2006.01)

(52) U.S. Cl.
CPC ............... *G06F 7/36* (2013.01); *G06F 16/22* (2019.01); *G06F 16/24578* (2019.01); *H04L 41/0893* (2013.01); *H04L 41/12* (2013.01); *H04L 41/0233* (2013.01)

(58) Field of Classification Search
USPC .......................................................... 707/728
See application file for complete search history.

(56) References Cited

U.S. PATENT DOCUMENTS

| | | | |
|---|---|---|---|
| 5,948,055 A * | 9/1999 | Pulsipher | H04L 41/22 709/202 |
| 5,991,877 A | 11/1999 | Luckenbaugh | |
| 6,041,058 A | 3/2000 | Flanders et al. | |
| 6,212,266 B1 | 4/2001 | Busuioc | |
| 6,266,513 B1 | 7/2001 | Briancon | |
| 6,286,047 B1 * | 9/2001 | Ramanathan | H04L 29/12066 370/229 |
| 6,336,138 B1 | 1/2002 | Caswell et al. | |
| 6,496,838 B1 | 12/2002 | Zamora-Mckelvy et al. | |
| 6,820,090 B2 | 11/2004 | Chambers et al. | |
| 6,836,798 B1 | 12/2004 | Adams | |
| 7,003,402 B2 | 2/2006 | Christie et al. | |
| 7,082,426 B2 | 7/2006 | Musgrove et al. | |
| 7,146,380 B2 | 12/2006 | Schaepe et al. | |
| 7,155,427 B1 | 12/2006 | Prothia et al. | |
| 7,346,044 B1 | 3/2008 | Chou et al. | |
| 7,380,025 B1 | 5/2008 | Riggins et al. | |
| 7,395,256 B2 | 7/2008 | Ji et al. | |
| 8,166,002 B2 | 4/2012 | Robinson et al. | |
| 8,554,750 B2 | 10/2013 | Rangarajan et al. | |
| 8,683,032 B2 | 3/2014 | Spinelli et al. | |
| 8,712,979 B2 | 4/2014 | Morozov et al. | |
| 8,799,436 B2 | 8/2014 | Ayachitula et al. | |
| 9,137,115 B2 | 9/2015 | Mayfield et al. | |
| 9,158,799 B2 | 10/2015 | Morozov | |
| 9,323,801 B2 | 4/2016 | Morozov et al. | |
| 2002/0002555 A1 | 1/2002 | Wolman et al. | |
| 2002/0009085 A1 | 1/2002 | Barkai et al. | |
| 2002/0143935 A1 | 10/2002 | Schenkel et al. | |
| 2002/0184529 A1 | 12/2002 | Foster et al. | |
| 2003/0058813 A1 | 3/2003 | Viola et al. | |
| 2003/0126108 A1 | 7/2003 | Martino et al. | |
| 2003/0200294 A1 | 10/2003 | Thorpe et al. | |
| 2004/0019672 A1 | 1/2004 | Das et al. | |
| 2004/0025157 A1 | 2/2004 | Blight et al. | |
| 2004/0143600 A1 | 7/2004 | Musgrove | |
| 2004/0146008 A1 | 7/2004 | Conradt et al. | |
| 2004/0220963 A1 | 11/2004 | Chen et al. | |
| 2004/0264435 A1 | 12/2004 | Chari et al. | |
| 2005/0038889 A1 | 2/2005 | Frietsch | |
| 2005/0080613 A1 | 4/2005 | Colledge et al. | |
| 2005/0111362 A1 | 5/2005 | Freytsis et al. | |
| 2005/0216433 A1 | 9/2005 | Bland et al. | |
| 2005/0234973 A1 | 10/2005 | Zeng | |
| 2006/0059253 A1 | 3/2006 | Goodman et al. | |
| 2006/0064481 A1 | 3/2006 | Baron et al. | |
| 2006/0069801 A1 | 3/2006 | Rich et al. | |
| 2006/0080656 A1 | 4/2006 | Cain et al. | |
| 2006/0106590 A1 | 5/2006 | Tseng et al. | |
| 2006/0123104 A1 | 6/2006 | Spinelli et al. | |
| 2006/0123393 A1 | 6/2006 | Atkins et al. | |
| 2006/0136459 A1 | 6/2006 | Trinon et al. | |
| 2006/0136585 A1 | 6/2006 | Mayfield et al. | |
| 2006/0178954 A1 | 8/2006 | Thukral et al. | |
| 2006/0179124 A1 | 8/2006 | Stefaniak et al. | |
| 2006/0271341 A1 | 11/2006 | Brown et al. | |
| 2007/0097959 A1 | 5/2007 | Taylor | |
| 2007/0239700 A1 | 10/2007 | Ramachandran | |
| 2008/0021917 A1 | 1/2008 | Baker | |
| 2008/0183724 A1 | 7/2008 | Mueller | |
| 2008/0301081 A1 | 12/2008 | Karnik et al. | |
| 2009/0063562 A1 | 3/2009 | Dinger et al. | |
| 2009/0094462 A1 | 4/2009 | Madduri | |
| 2009/0319932 A1 | 12/2009 | Robinson | |
| 2010/0161577 A1 | 6/2010 | Morozov | |
| 2011/0238637 A1 | 9/2011 | Morozov et al. | |
| 2012/0259812 A1 | 10/2012 | Rangarajan et al. | |
| 2013/0007011 A1 | 1/2013 | Setlur et al. | |
| 2013/0124681 A1 | 5/2013 | Rudenko et al. | |
| 2014/0143416 A1 | 5/2014 | Spinelli et al. | |
| 2014/0195504 A1 | 7/2014 | Morozov et al. | |
| 2014/0279992 A1 | 9/2014 | Morozov | |
| 2015/0381419 A1 | 12/2015 | Kumar et al. | |
| 2016/0034503 A1 | 2/2016 | Morozov | |
| 2016/0196307 A1 | 7/2016 | Morozov et al. | |

OTHER PUBLICATIONS

Final Office Action for U.S. Appl. No. 14/164,524, dated Aug. 25, 2016, 20 pages.
Non Final Office Action for U.S. Appl. No. 13/082,194, dated Nov. 18, 2016, 47 pages.
Non Final Office Action for U.S. Appl. No. 14/164,524, dated Mar. 3, 2017, 22 pages.
Non Final Office Action for U.S. Appl. No. 14/877,332, dated Jul. 14, 2016, 45 pages.
Response to Non Final Office for U.S. Appl. No. 14/877,332, filed Nov. 14, 2016, 12 pages.
"U.S. Appl. No. 11/295,363, Notice of Allowance dated Nov. 4, 2013", 23.
"U.S. Appl. No. 12/570,628 Advisory Action dated Apr. 25, 2012", 3.
"U.S. Appl. No. 12/570,628 Non-Final Office Action dated Sep. 7, 2011", 12.
"U.S. Appl. No. 12/860,334 Final Office Action dated Oct. 5, 2012", 23.
"U.S. Appl. No. 12/860,334, Notice of Allowance dated Dec. 17, 2013", 13.
"U.S. Appl. No. 12/860,334 Non-Final Office Action dated Jun. 22, 2012", 15.
"U.S. Appl. No. 13/082,194 Non-Final Office Action dated Jun. 21, 2012", 24.
"U.S. Appl. No. 13/082,194 Final Office Action dated Oct. 17, 2012", 45.
"BMC Atrium CMDB 7.5.00", User's Guide, 71 pages, Jan. 2009.
"BMC Atrium CMDB 7.5.00 Patch 001, Normalization and Reconciliation Guide", 132 pages, Mar. 2009.
"BMC Atrium Core 7.6.00; Concepts and Planning Guide", Sep. 2009, 1-164.
"BMC Atrium Core 7.6.00; Normalization and Reconciliation Guide", Sep. 2009, 1-148.
"BMC Atrium Core 7.6.00; User's Guide", Sep. 2009, 1-78.
"Configuration Management Database (CMDB) Federation Specification", Document number: D5P0252, Version: 1.0.0, Jun. 22, 2009., 72 pages.
"European Search Report dated Apr. 3, 2006.", 8 pages.
"European Search Report for European Patent Application No. 05257483.7, dated Mar. 31, 2006", 7 pages.
"Final Office Action received for U.S. Appl. No. 12/570,628, dated May 2, 2014", 15 pages.

(56) References Cited

OTHER PUBLICATIONS

"The Four Challenges of Customer-Centric Data Warehousing" Carleton Corporation. Nov. 1998., Nov. 1998, 16.
Non-Final Office Action received for U.S. Appl. No. 11/204,189, dated Dec. 8, 2014, 9 pages.
Advisory Action received for U.S. Appl. No. 11/204,189, dated May 4, 2010, 3 pages.
Final Office Action received for U.S. Appl. No. 11/204,189, dated Feb. 22, 2010, 11 pages.
U.S. Appl. No. 11/204,189, "Notice of Allowance Received", May 8, 2015, 7 pages.
Response to Final Office Action received for U.S. Appl. No. 11/204,189, filed Mar. 26, 2014, 10 pages.
Response to Non Final Office Action filed for U.S. Appl. No. 11/204,189, filed Mar. 30, 2015, 10 pages.
Final Office Action Response filed for U.S. Appl. No. 11/295,363, filed Jan. 18, 2013, 14 pages.
Non Final Office Action mailed for U.S. Appl. No. 11/295,363, dated Apr. 3, 2013, 23 pages.
Non Final Office Action Response filed for U.S. Appl. No. 11/295,363, filed Jul. 3, 2013, 18 pages.
U.S. Appl. No. 12/570,628, "Final Office Action", dated May 2, 2014, 15 pages.
U.S. Appl. No. 12/570,628, "Final Office Action Received", dated Jul. 10, 2015, 19 Pages.
Final Office Action received for U.S. Appl. No. 12/570,628, dated Feb. 21, 2012, 13 pages.
Final Office Action Response filed for U.S. Appl. No. 12/570,628, filed Apr. 12, 2012, 10 pages.
Final Office Action Response filed for U.S. Appl. No. 12/570,628, filed Jun. 6, 2012, 12 pages.
Non Final Office Action received for U.S. Appl. No. 12/570,628, dated Oct. 7, 2013, 13 pages.
Non Final Office Action received for U.S. Appl. No. 12/570,628, dated Sep. 7, 2011, 12 pages.
Non Final Office Action Response filed for U.S. Appl. No. 12/570,628, filed Dec. 7, 2011, 11 pages.
Non Final Office Action Response filed for U.S. Appl. No. 12/570,628, filed Jan. 7, 2014, 10 pages.
U.S. Appl. No. 12/570,628, "Non-Final Office Action Received", dated Sep. 11, 2014, 16 Pages.
Response to Non Final Office Action for U.S. Appl. No. 12/570,628, filed Jan. 12, 2015, 11 pages.
Supplemental Response to Non-Final Office Action for U.S. Appl. No. 12/570,628, filed Mar. 6, 2015, 13 pages.
U.S. Appl. No. 12/860,334, Advisory Action dated Nov. 29, 2012, 3 pages.
Final Office Action received for U.S. Appl. No. 12/860,334, dated Oct. 5, 2012, 16 pages.
Final Office Action Response filed for U.S. Appl. No. 12/860,334, filed Nov. 21, 2012, 13 pages.
Non Final Office Action received for U.S. Appl. No. 12/860,334, dated Jun. 22, 2012, 13 pages.

\* cited by examiner

SYSTEM AND METHOD FOR RESOURCE RECONCILIATION IN AN ENTERPRISE MANAGEMENT SYSTEM

CROSS-REFERENCE TO RELATED APPLICATION

This application is a continuation application of U.S. application Ser. No. 14/851,899, filed Sep. 11, 2015, entitled "Resource Reconciliation", which claims priority to and the benefit of U.S. application Ser. No. 11/204,189, filed Aug. 15, 2005, entitled "Resource Reconciliation", which claims priority to and the benefit of U.S. provisional patent application entitled "Change Configuration Management," filed Dec. 6, 2004, assigned Ser. No. 60/633,640, all of which are hereby incorporated by reference in their entireties.

COMPUTER PROGRAM LISTING APPENDIX

A computer program listing appendix has been submitted in accordance with 37 C.F.R. 1.96(c), 1.77(b)(4) and 1.52(e). The afore-mentioned computer program listing appendix comprises a single compact disk having stored thereon the following files: "schema.txt" (created 15 Jul. 2005 having 3,762,902 bytes); and "api.txt" (created 15 Jul. 2005 having 62,157 bytes). File schema.txt is an ASCII text file comprising concatenated source code files that, collectively, specify an illustrative class schema in accordance with one embodiment of the invention (see, for example, element 215 in FIG. 2). File api.txt is an ASCII text file describing a reconciliation engine to database application programming interface in accordance with one embodiment of the invention (see, for example, element 220 in FIG. 2). The source code listings provided as part of the computer program listing appendix contain material which is subject to copyright protection. The copyright owner (BMC Software, Inc.) has no objection to the facsimile reproduction by anyone of the patent document or the patent disclosure as it appears in the Patent and Trademark Office file or records, but otherwise reserves all copyright rights whatsoever. The source code listings provided as part of the computer program listing appendix are hereby incorporated by reference.

BACKGROUND

The invention relates generally to enterprise management systems and more particularly to the reconciliation of objects (representing resources) input to the management system from different sources.

Today's businesses rely on a myriad of complex software applications to service customers or clients as well as to manage internal operations. Many of these applications require an extensive set of information technology ("IT") components, some unique and some shared with other applications. It will be appreciated that in an enterprise environment in which an organization's network (or interconnected networks) can span diverse geographical locations and include a number of different computational platforms, operating systems, protocols, and network architectures, it is becoming more and more important to know what resources are available so that they may be used most efficiently in supporting the businesses needs. In addition, regulations such as Sarbanes-Oxley are putting pressure on businesses to accurately discover, track and report what resources they own, who has access to them, and the change history around those systems and software. As used herein, the term "resource" includes, but is not limited to, computer systems, components of computer systems, data storage systems, switches, routers, memory, software applications (e.g., accounting and database applications), operating systems and business services (e.g., order entry or change management and tracking services).

In large computing environments or enterprises, multiple applications may be used to "discover" or detect resources comprising, or available for use by or within, the computing environment. In such situations, a single resource may have been discovered and reported to an enterprise's configuration management system multiple times. Thus, it would be beneficial to provide a mechanism to identify and reconcile the discovery of IT resources from multiple sources. Only with this capability can an enterprise's resources be effectively managed.

SUMMARY

In one embodiment the invention provides a method to reconcile computer resources identified by resource discovery operations. The method includes accessing information describing one or more resources obtained from a plurality of discovery sources; identifying, via the accessed information, at least one resource that has been detected or discovered by at least two of the discovery sources; and merging the attribute values associated with the resource (from each of the discovery sources that detected the resource) into a reconciled resource object. The method may be stored in any media that is readable and executable by a computer system. In addition, methods in accordance with the invention may be executed by one or more processing units comprising a computer system.

DETAILED DESCRIPTION

Techniques to reconcile the detection of computational resources (e.g., hardware, software and services) from a number of different sources are described. The following embodiments of the invention, described in terms of a change configuration management system, are illustrative only and are not to be considered limiting in any respect.

Figure 1:
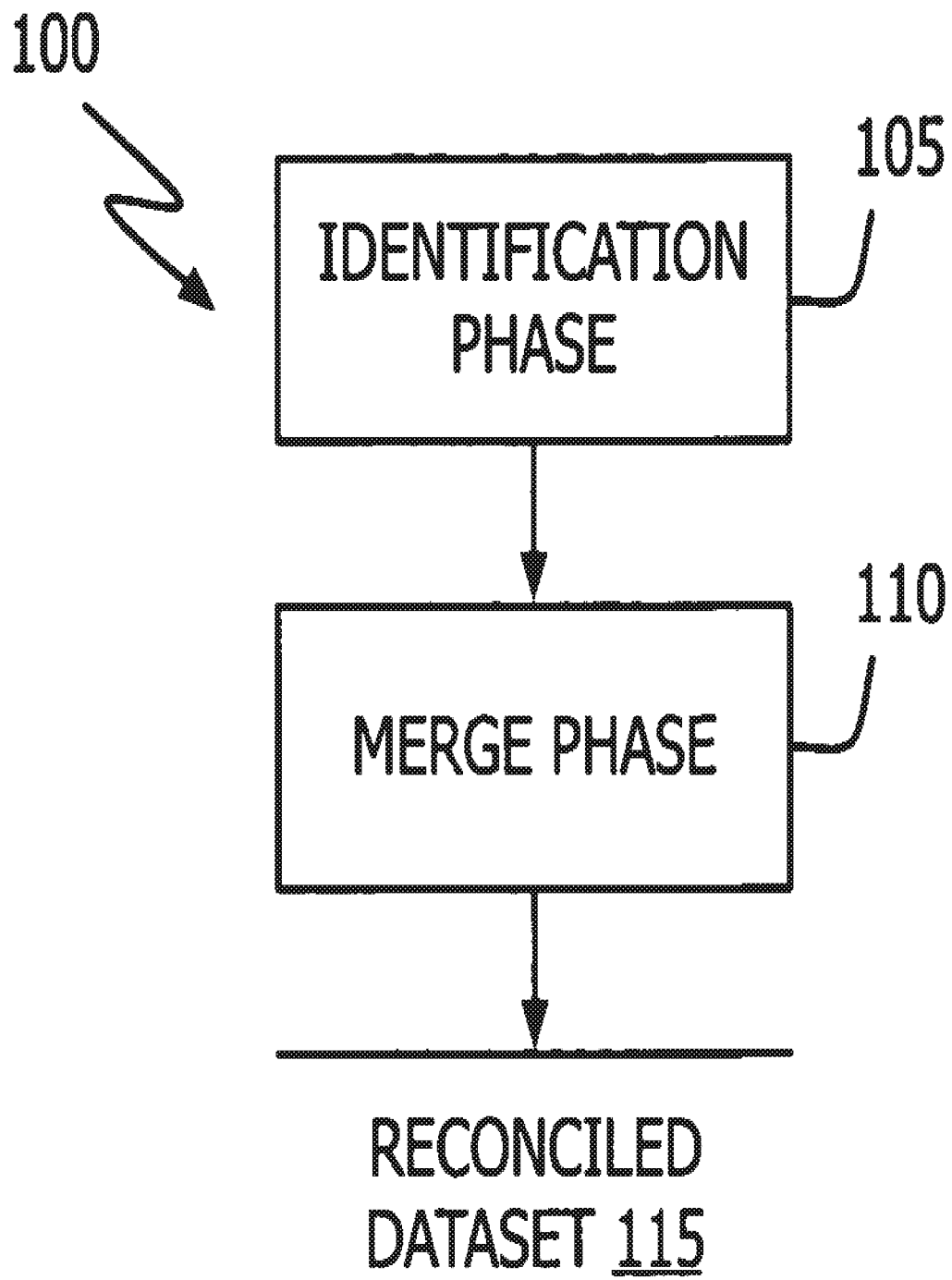
FIG. 1 shows, in flowchart form, a reconciliation process in accordance with the invention.

Referring to FIG. 1, reconciliation process 100 in accordance with the invention includes identification phase 105 and merge phase 110, generating reconciled dataset 115. During identification phase 105 resources are detected through, for example, automated and/or manual discovery operations. Illustrative discovery operations include those provided by the Discovery Express and PATROL®. Visualis products from BMC Software, Inc. (PATROL is a registered trademark of BMC Software, Inc. of Houston, Tex.) Illustrative resources include computer systems, computer system components, data storage systems, switches, routers, memory, software applications (e.g., accounting and database applications), operating systems and business services (e.g., order entry or change management and tracking services). It will be recognized that in a typical software embodiment, each detected resource may be represented as an object (a software entity) that includes one or more attributes. For example, a computer system resource may be represented by a computer system object whose attributes include, among others, "Name," "IP Number" and "Operating System." Identification phase 105 also analyzes detected resources to determine if they were previously identified and reconciled or whether they are a newly detected resource. During merge phase 110, the data associated with resource objects (e.g., a resource objects' attributes) identified as being different instances of a common resource are combined into a single or reconciled resource object. This reconciled resource object is pushed into (i.e., associated with) reconciled dataset 115. (Unitary identified resource objects may also be moved into reconciled dataset 115.)

Figure 2:
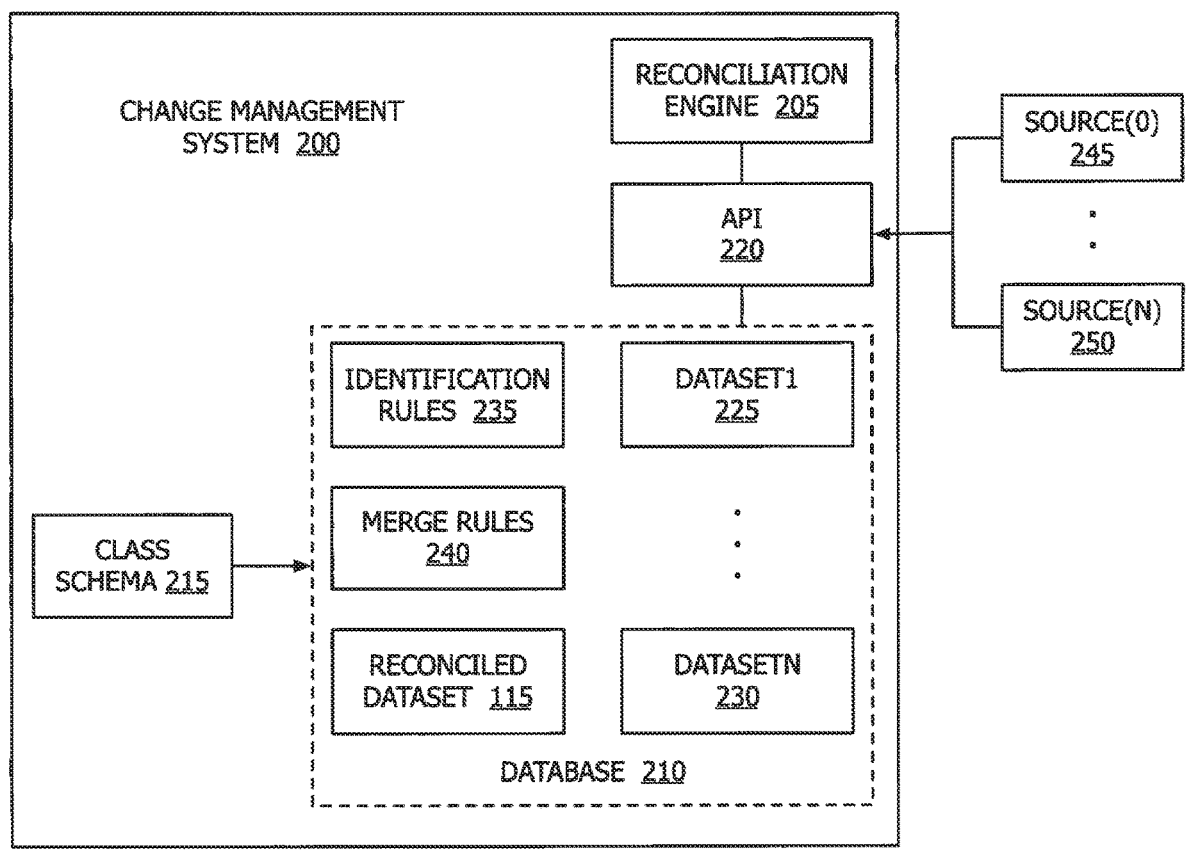
FIG. 2 shows, in block diagram form, one aspect of a change management system in accordance with one embodiment of the invention.

Referring to FIG. 2, illustrative change management system 200 includes reconciliation engine 205, database 210, class schema 215 and database application programming interface ("API") 220. Reconciliation engine 205 utilizes reconciliation process 100 in accordance with the invention. Database 210 provides, inter alia, for the storage of information related to discovered and identified resources (datasets 225 through 230), reconciled resources (reconciled dataset 115) and the rules or policies by which reconciliation engine 205 performs the acts of identifying (identification rules 235) and merging (merge rules 240). Class schema 215 defines the resource object hierarchy which reconciliation engine 205 and, in fact, change management system 200 operates. That is, class schema 215 defines the types and attributes that a resource object may have. For example, while each resource discovery source (e.g., 245 or 250) may use its own scheme for representing detected resources, each source must supply its information to change management system 200 (through API 220) in accordance with class schema 215. In one embodiment, database 210 comprises a configuration management database ("CMDB") in accordance with the Information Technology Infrastructure Library ("ITIL") standard. (See, http://www.ogc.gov.uk/index.asp?id=2261 for ITIL information.) An illustrative class schema is described in source code format in a computer program listing appendix. As will be discussed in further detail below, in addition to defining what attributes any given type of resource includes, class schema 215 defines an object identifier ("Object_ID") and reconciliation identifier ("Reconciliation_ID") attribute for each object type. Accordingly, every instance of a resource object stored in database 210 includes an Object_ID and a Reconciliation_ID attribute value. It will be recognized that one potential Object_ID or Reconciliation_ID value is a NULL value— such value indicating the resource object has not been identified and/or reconciled (e.g., a newly created an unreconciled object may have Object_ID and/or Reconciliation_ID values of zero, "0"). Database API 220 provides a mechanism by which entities such as reconciliation engine 205 and resource discovery sources 245 through 250 retrieve information from and/or store information into database 210 (e.g., datasets 225-230). An illustrative application programming interface ('API') is provided in source code format in a computer program listing appendix.

Figure 3A:
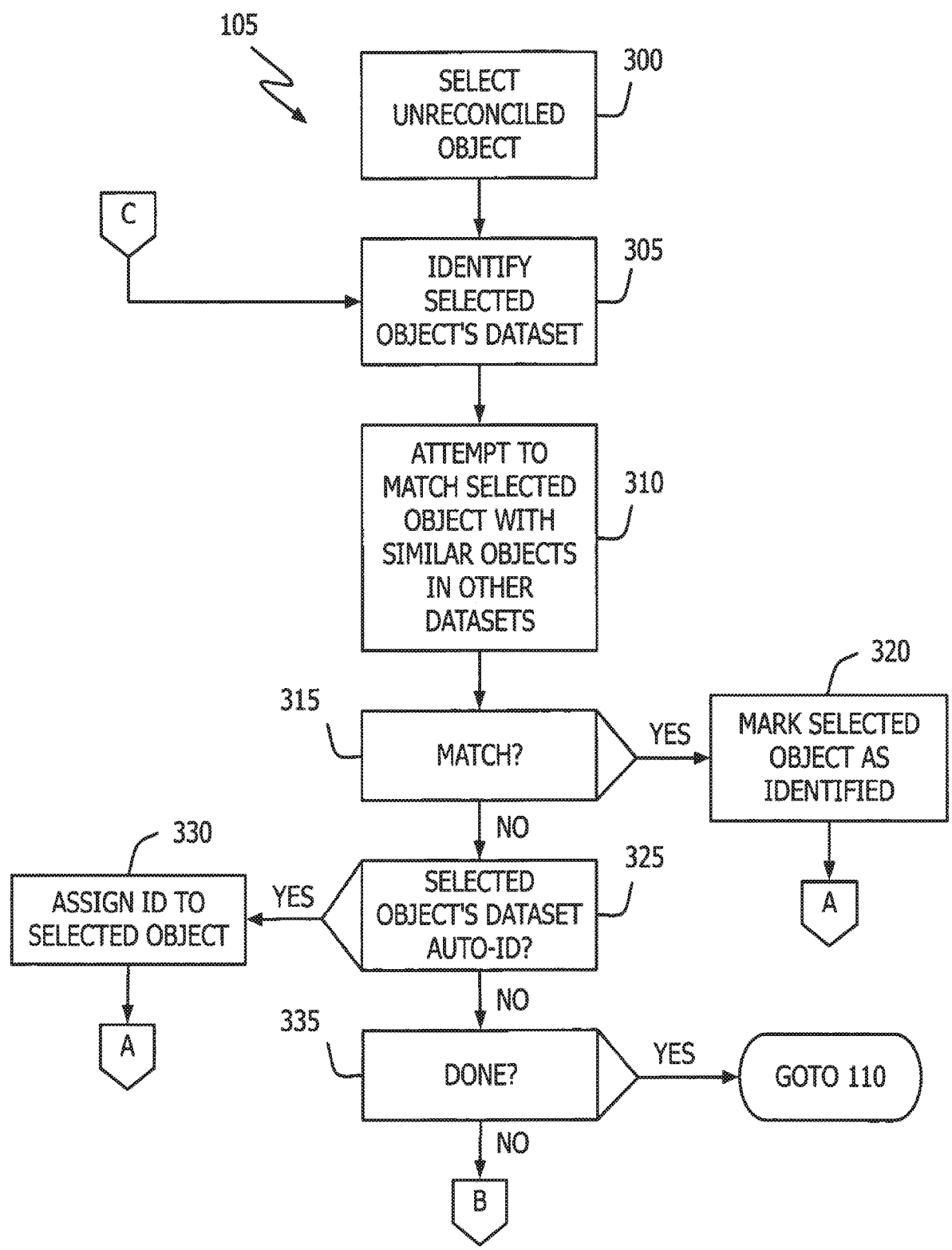
FIGS. 3A and 3B show, in flowchart form, an identification phase operation in accordance with one embodiment of the invention.
Figure 3B:
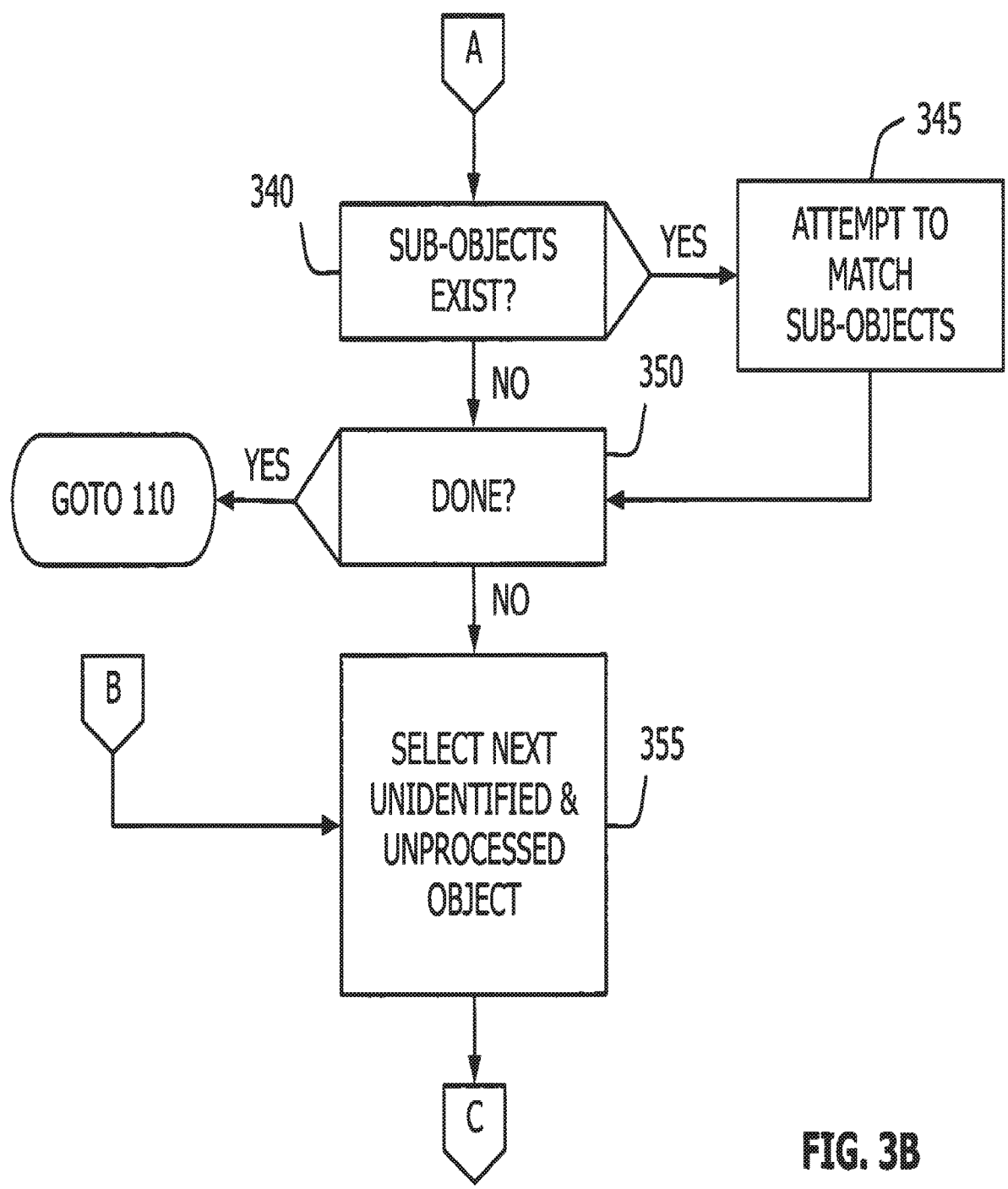

One embodiment of identification phase 105 is shown in detail in FIGS. 3A and 3B. Referring to FIG. 3A, a first unreconciled resource object is selected from all of the unreconciled resource objects supplied by discovery sources 245-250 to database 210 and stored in, for example, datasets 225-230 (block 300). After identifying the dataset associated with the resource object and, therefore, the source that detected the resource (block 305), an attempt is made to match the selected resource object with similar objects (in accordance with class schema 215) in other datasets that have already been identified and reconciled (block 310).

Figure 4:
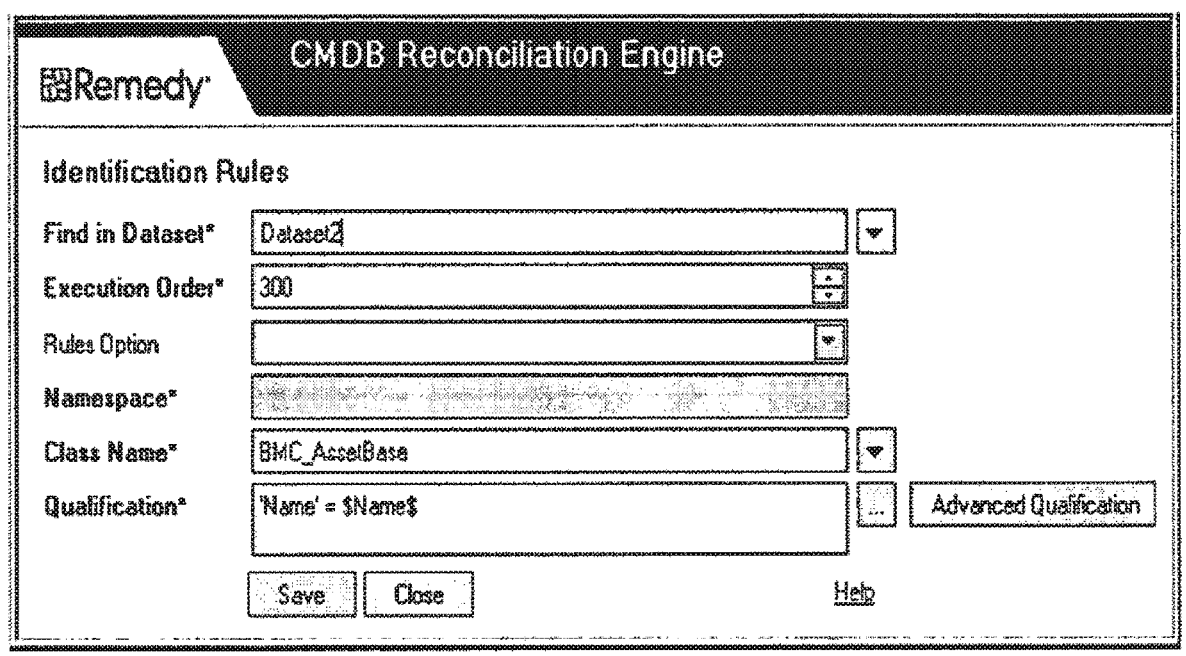
FIG. 4 shows a screen image of an identification rule dialog box in accordance with one embodiment of the invention.
Figure 5:
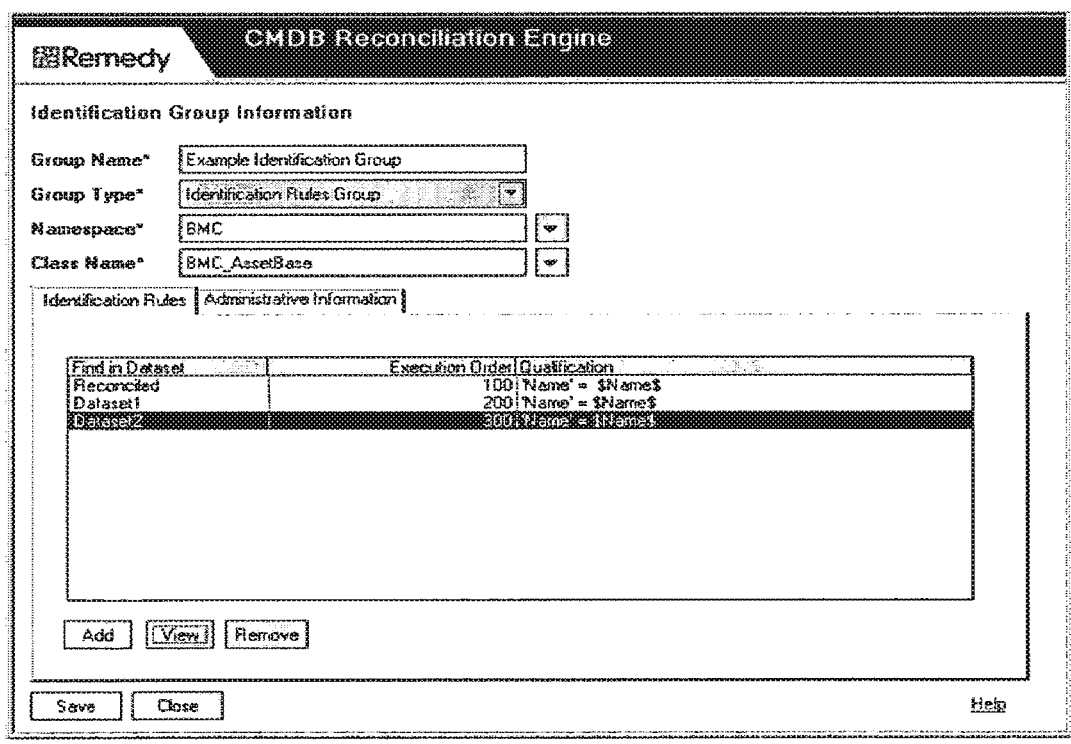
FIG. 5 shows a screen image of an identification group dialog box in accordance with one embodiment of the invention.

Generally, reconciliation engine 205 uses identification rules 235 to drive the match process. In one embodiment, identification rules 235 are organized into identification groups, with each rule specifying what attributes should be considered when determining a match, the type of object to be matched and the discovery source or dataset to which the rule applies. Identification groups may contain any number of rules and, in addition, may be ordered such that individual rules within a group are processed in a given order. For example, if Dataset1 represents the bulk of discovered resources and Dataset2 contains relatively few instances, it is more likely that an unidentified object will find a match in Dataset1. As such, Dataset1 may be listed (and processed) before Dataset2 in the identification group. Alternatively, if Dataset2 represents resources discovered by a particularly robust or accurate discovery process, it may be searched first. FIG. 4 shows a screen-shot image of an identification rule dialog box in accordance with one embodiment of the invention. FIG. 5 shows a screen-shot image of an identification group dialog box in accordance with one embodiment of the invention. Table 1 provides a textual description of the illustrative identification group shown in FIG. 5. TABLE-US-00001 TABLE 1 Explanation of Illustrative Identification Group of FIG. 5 Find in Matching Dataset . . . Qualification Description Reconciled 'Name'=$Name$ Look for a match in the reconciled dataset. A match is where the values of the 'Name' attribute of the unidentified resource object instance match that of the reconciled dataset's instance. Dataset1 'Name'=$Name$ Next, look for a match in the Dataset1 dataset. Dataset2 'Name'=$Name$ Finally, look for a match in the Dataset2 dataset.

It will be recognized that class schema 215 (see FIG. 2) defines an object hierarchy to which inheritance applies. As shown in FIGS. 4 and 5, identification rules and identification groups are associated with a dataset for a given class of object. Since reconciliation engine 205 is aware of class schema 215, rules may be applied to instances of a class' sub-classes. That is, the same identification rule may be applied to unidentified instances whose class derives from the class associated with the rule specified in the identification rule. In one embodiment, this 'rule inheritance' feature may be the default mechanism for processing rules during identification phase 105. In another embodiment, rule inheritance may not be used. In still another embodiment, rule inheritance may be turned on, or off, by a user on a per-class basis.

Referring again to FIG. 3A, if the object selected in accordance with block 300 is determined to match a prior identified resource object (the "YES" prong of block 315), it is marked as identified (block 320). In one embodiment, the act of "marking an object as identified" comprises assigning the object's Reconciiation_ID attribute value with that value assigned to the resource object which was used to identify it.

Referring now FIG. 3B, a test is then made to determine if the newly identified object includes or comprises sub-objects (block 340). For example, if the identified object is a computer system object, it may include monitor, keyboard, pointing device, processor, memory or storage media sub-objects. Further, a sub-object (e.g., a storage resource object) may itself include sub-objects (e.g., disk drive, CD ROM, tape unit and floppy disk objects). If the newly identified object contains unidentified sub-objects (the "YES" prong of block 340), an attempt to identify each sub-object is made (block 345); such identification proceeding as described with respect to blocks 310-320. If the newly identified object has no sub-objects (the "NO" prong of block 340) or identification in accordance with block 345 is complete, a check is made to determine if additional unidentified objects remain to be processed (block 350). If no more objects remain to be processed (the "YES" prong of block 350), merge phase 110 is initiated. If more objects remain to be processed (the "NO" prong of block 350), the next unidentified and unprocessed object is selected (block 355) and processing continues at block 305.

Referring once again to FIG. 3A, if the object selected in accordance with block 300 is determined not to match a prior identified resource object (the "NO" prong of block 315), a check is made to determine if the selected object is associated with an "auto-identify" dataset. In the embodiment described in FIGS. 3A and 3B, one or more datasets may be designated as auto-identify datasets via the identification rules (see discussion above). Reconciliation engine 205 assigns a unique Reconciliation_ID to each resource object instance in an auto-identify dataset if the following conditions are satisfied: (1) at least one of the identification rules associated with the object searches in the reconciliation phase's master dataset for a match; and (2) the identification rules fail to find a match. In general, the "master" dataset is that dataset that is the target of the reconciliation process 100—e.g., reconciled dataset 115. If the selected object is from a dataset designated as auto-identify (the "YES" prong of block 325), it is assigned unique object and reconciliation identifier values (block 330), whereafter processing continues at block 340 as described above. If the selected object is not from a dataset designated as auto-identify (the "NO" prong of block 325), a check is made to determine if additional objects remain to be identified. If no more objects remain to be processed (the "YES" prong of block 335), merge phase 110 is initiated. If more objects remain to be processed (the "NO" prong of block 335), processing continues at block 355 as described above.

It will be recognized that if after identification phase 105 one or more resource object instances remain unidentified, it may be necessary to either refine the identification rules or perform a match manually through, for example, a user interface. In one embodiment of a manual identification operation, the user could be presented with a list of unidentified resource object instances and a list of identified resource object instances. The user could then select an unidentified resource object instance, perform searches to refine the candidate list of identified instances, select an identified resource object instance, and apply the identity (e.g., the Reconciliation_ID attribute value of the unidentified resource object instance would be set to the value of the Reconciliation_ID attribute of the identified resource object instance).

Figure 6:
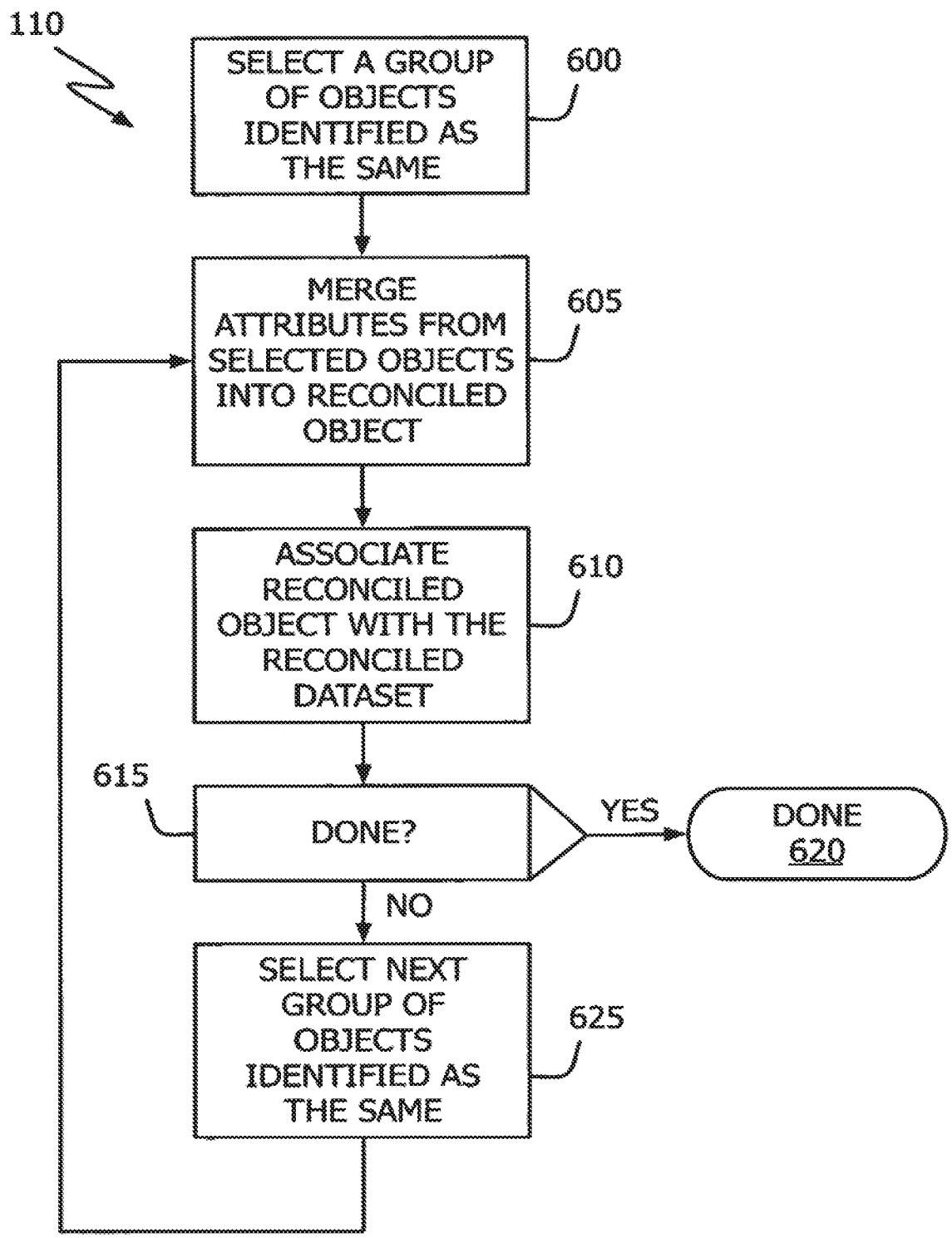
FIG. 6 shows, in flowchart form, a merge phase operation in accordance with one embodiment of the invention.

In the embodiments described herein, merge phase 110 pulls together resource object instances from different datasets that, thru identification phase 105, have been assigned the same Reconciliation_ID attribute value and either modifies or creates an instance of the resource object in a resulting dataset (e.g., reconciled dataset 215). One particular embodiment of merge phase 110 is shown in detail in FIG. 6. To begin, a first group of objects determined (during identification phase 105) to be different instances of a single resource are selected (block 600). For example, in the embodiment described above this would be all identified objects having a common Reconciliation_ID attribute value. Attributes associated with each of the selected objects are then merged into a single, reconciled, resource object (block 605) which is then associated (if it is not already) with reconciled dataset 215 (block 610). If no additional objects remain to be processed (the "YES" prong of block 615), reconciliation process 100 is complete (block 620). If, however, additional objects remain to be processed (the "NO" prong of block 615), the next group of unreconciled objects are selected (block 625) and processing continues in accordance with block 605.

Figure 7:
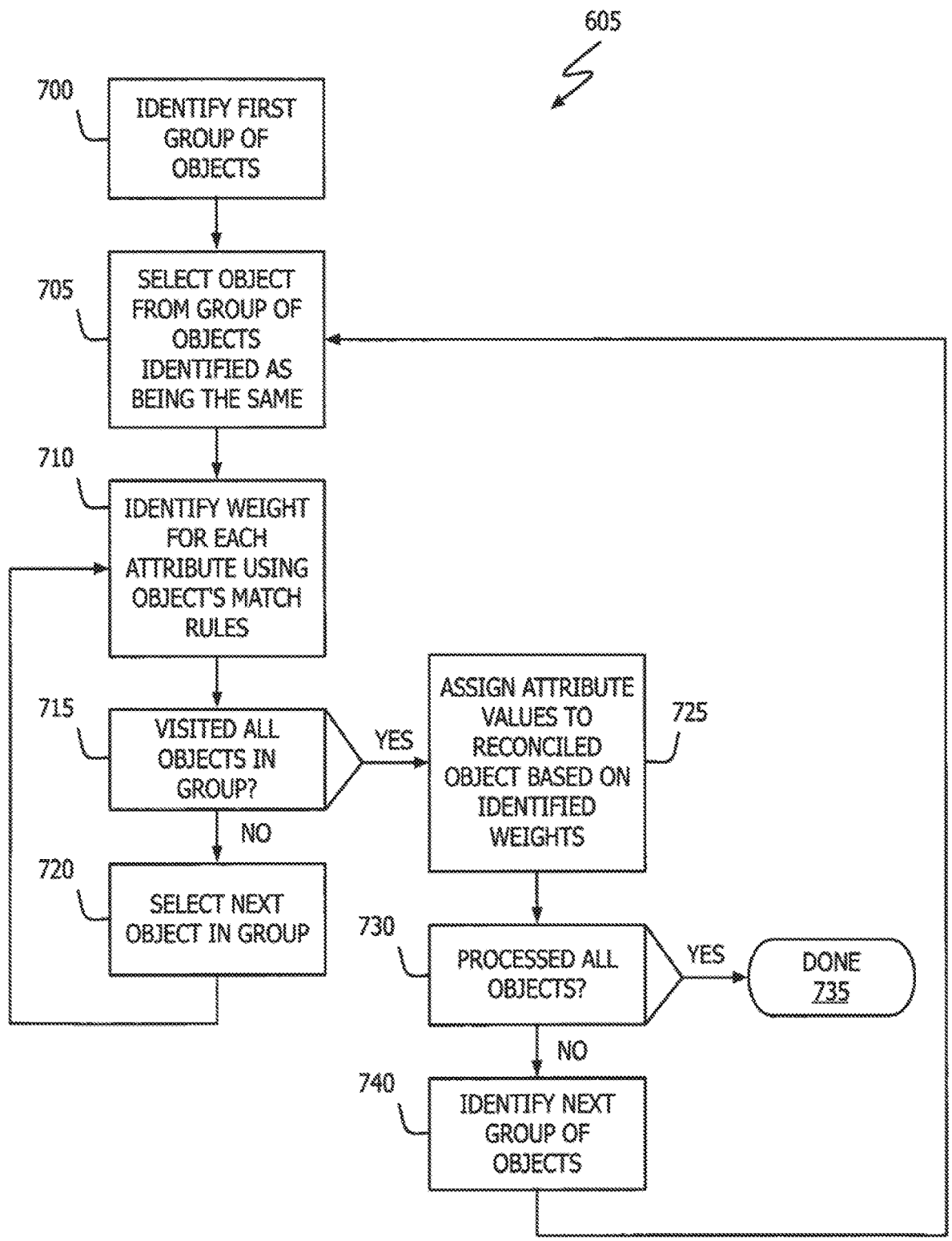
FIG. 7 shows, in flowchart form, an attribute value merge operation in accordance with one embodiment of the invention.

In one embodiment, the attribute merge operation of block 605 is shown in FIG. 7. A group of one or more resource objects is identified for processing, where each member of the group was assigned the same reconciliation identifier value during identification phase 105 (block 700). From the selected group a first resource object is selected (block 705). A weight is then assigned to each of the identified resource object's attributes in accordance with merge rules 240 (block 710). Until all of the resource objects within the currently identified group have had weights assigned to their attributes (the "NO" prong of block 715), the next object within the group is selected (block 720) whereafter processing continues at block 710. Once all attributes for each of the resource objects in the identified group have been assigned a weight (the "YES" prong of block 715), that attribute value (for each defined attribute associated with the resource object) having the largest weight is selected and assigned to the corresponding attribute in the reconciled data object (block 725). For example, if there are N resource objects in the selected group there could be up to N values for each attribute associated with the object. In the embodiment described herein, that attribute value assigned the largest weight during the acts of block (710) would be selected and assigned to the corresponding attribute in the reconciled data object. If all identified objects have been processed (the "YES" prong of block 730), merge phase 110 is complete (block 735). If, however, additional identified objects remain to be processed (the "NO" prong of block 730), the next group of resource objects is identified (block 740) and processing continues at block 705. It will be recognized that, although merge operation 605 has been described as "assigning" weights, in practice this may not actually occur. For example, it has been found convenient to "assign" weights through rules (that is, weights are associated with rules—see discussion below) that are evaluated during merge operation 605. In this context, weights are not assigned, but rather evaluated during merge operation 605, with the object having the highest evaluated weight being selected.

Figure 8:
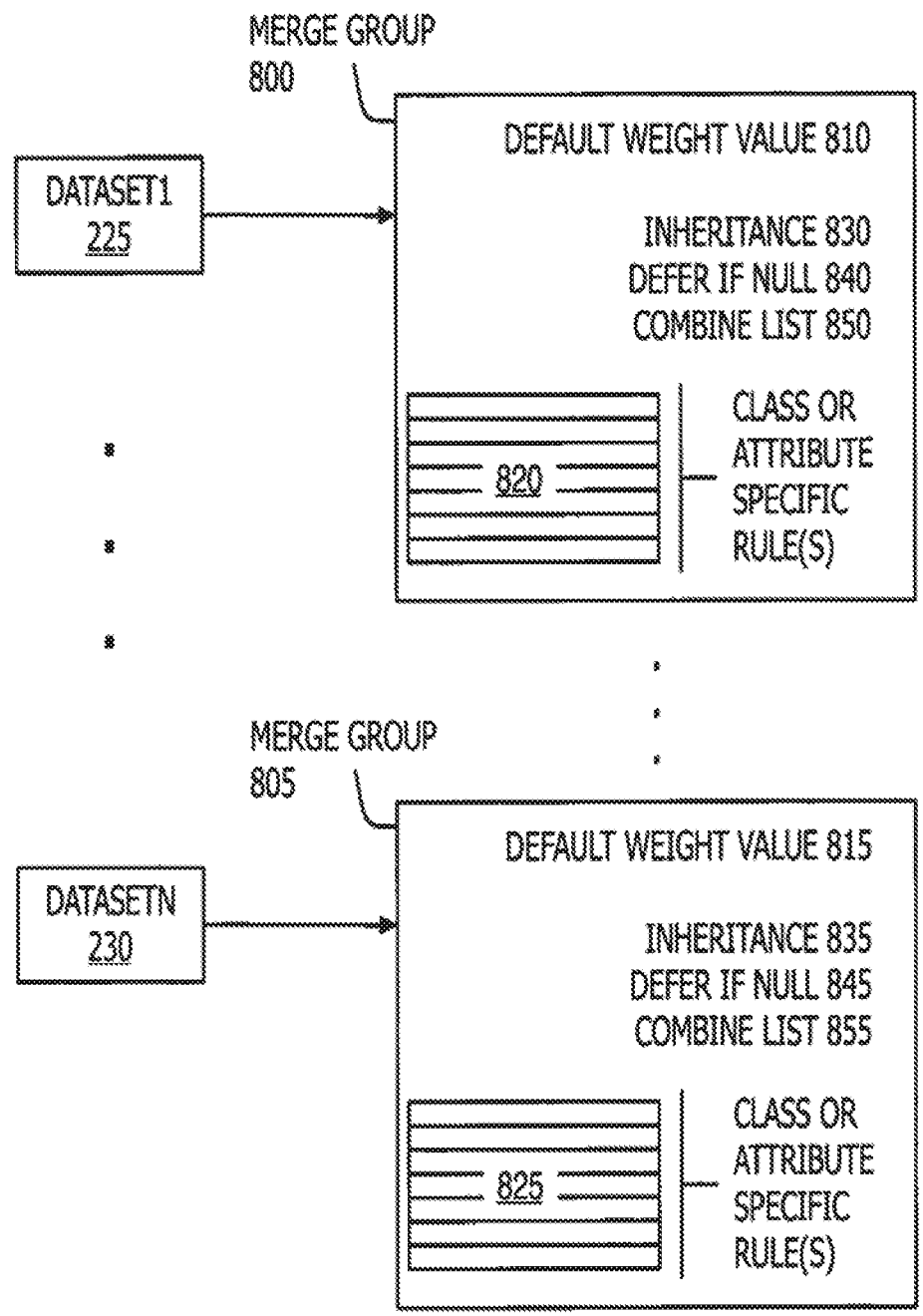
FIG. 8 shows the functional structure of a merge group in accordance with one embodiment of the invention.

Reconciliation engine 205 uses merge rules 240 to assign a weight value to each attribute for each resource object reconciled in accordance with FIG. 7. Referring to FIG. 8, in one embodiment merge rules are organized into merge groups (e.g., 800 and 805), each merge group being associated with a single dataset (e.g., Dataset1 225 and DatasetN 230). As shown, each merge group can include a default weight value (e.g., 810 and 815), zero or more class or attribute specific rules (e.g., 820 and 825), an "Inheritance" flag (e.g., 830 and 835), a "Defer if Null" indicator (e.g., 840 and 845) and an attribute value combination designator (e.g., 850 and 855).

With respect to default weight value 810 (815), this is the weight value assigned to each attribute of each object in associated dataset 225 (230) if no class or attribute specific rule 820 (825) exists to override it. Class or attribute specific rules 820 (825) can be put in place to override any default value. For example, a class specific rule could stipulate that all resource objects of a given type (e.g., a computer system resource object or storage media resource object) be assigned a specified value. Similarly, an attribute specific rule could stipulate that one or more attributes in a designated object class be assigned a specified value. Class or attribute specific rules 820 and 825 may include no rules or any combination of one or more class or attribute specific rules.

In one embodiment of the invention, weight values are assigned to specific resource objects' attributes during the acts of block 710 in accordance with the algorithm shown in Table 2. TABLE-US-00002 TABLE 2 Illustrative Attribute Weight Assignment Algorithm IF an attribute-specific merge rule is defined for the attribute, Use the weight value specified by the rule; ELSE IF a class-specific merge rule is defined for the class to which the attribute's associated instance belongs, Use the weight value specified by the rule; ELSE IF a class-specific merge rule is defined for a super-class to which the attribute's associated instance belongs, Use the weight value specified by the rule; ELSE use the default weight value associated with the merge group.

With respect to a merge group's inheritance flag (e.g., 830 and 835), class and attribute specific merge rules (e.g., 820 and 825) may be made to apply in accordance with the inheritance properties of the data objects to which they are associated. For example, if a merge group's inheritance flag is set to "Yes" (or some functionally equivalent value), the weight assigned to any given attribute will be that weight that accounts for, or incorporates, the inheritance of the attribute's associated object class. By way of example, consider the case where objects of type ClassA and ClassB are defined in class schema 215, ClassB objects being a subclass of ClassA objects. Further, let ClassA objects include attributes A1 and A2 and ClassB objects include an attribute A3. If the relevant merge group includes class specific rules that specify a weight value of 200 for all attributes from objects of ClassA and a weight value of 600 for all attributes from objects of ClassB, then the attributes for an instance of ClassB would have the following weight values: A1=200; A2=200; and A3=600. If, on the other hand, the merge group's inheritance flag is set to "No" (or some functionally equivalent value), and the merge group's default weight value was 100, the attributes for an instance of ClassB would have the following weight values: A1=100; A2=100; and A3=600.

With respect to a merge group's defer if null indicator (e.g., 840 and 845), this parameter allows a user to specify what action to take when an attribute of an instance of a resource object has a "null" or "no" value. The defer if null indicator allows the user to defer to the dataset with the next weight for a given attribute if the highest weighted value is "null." This allows a user to basically say, "I'd rather have some value than no value at all, even if the source isn't the highest weighted." For example, if the relevant merge group's defer if null indicator is set to "True" (or some functionally equivalent value), the dataset with the next weight for a given attribute value is checked: if it's defer if null value is "False" (or some functionally equivalent value), the attribute's value is assigned; if its value is also null, then the next value is checked and so on, until all the datasets have been checked. If no mating value is detected, the attribute may be assigned a null or "nothing" value.

With respect to a merge group's attribute value combination designator (e.g., 850 and 855), this parameter allows a user to assign more than one value to an attribute of a reconciled object. For example, if the relevant merge group's attribute value combination designation is set to "Yes" (or some functionally equivalent value), the attribute values for each instance in a group may be combined (e.g., concatenated with individual values separated by a semicolon or comma) with the resulting list being assigned to the corresponding attribute value in the reconciled object. If the relevant merge group's attribute value combination designation is set to "No" (or some functionally equivalent value), the value assigned to the reconciled object's attribute is that value associated with the highest weight as described above.

Various changes in the details in the components and illustrated operational methods are possible without departing from the scope of the following claims. For instance, database 210 may be embodied as a distributed or federated database. In addition, identification rules 235 may use more than a single attribute to perform a match (see FIGS. 4 and 5 and Table 1). For example, an identification rule could be based on a combination of attributes such as name, name format (e.g., WINS, DNS or IP), revision number and the like. Further, merge phase 110 may use an attribute value selection algorithm other than that described in Table 2. For example, a reconciled object's attribute value could be the algebraic average, weighted average or median of the values from all detected resource objects. Also, database 210 could include more than a single reconciled dataset. In addition, acts in accordance with FIGS. 1, 3A, 3B, 6 and 7 may be performed by a programmable control device executing instructions organized into one or more program modules. A programmable control device may be a single computer processor, a special purpose processor, a plurality of processors coupled by a communications link or a custom designed state machine. Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The preceding description has been presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

What is claimed is:

1. A method to reconcile multiple instances of a single resource object using a reconciliation engine of a configuration management database (CMDB), the method comprising:

receiving, via an application programming interface (API), a plurality of unreconciled resource objects from one or more data sources, each of the plurality of unreconciled resource objects representing a component of a computer system, the component of the computer system including a device, switch, router, memory, software application, or operating system;

selecting, by the reconciliation engine, an unreconciled resource object from the plurality of unreconciled resource objects;

querying, by the reconciliation engine, the CMDB to determine whether the unreconciled resource object matches with at least one resource object stored in the CMDB according to at least one of a plurality of identification rules, each of the plurality of identification rules specifying which attributes are considered when determining a match during a reconciliation process, the plurality of identification rules including a first identification rule and a second identification rule, wherein the matching includes applying the first identification rule and the second identification rule in a defined order such that, when the first identification rule does not result in a match during the reconciliation process, the second identification rule is applied during the reconciliation process;

creating, by the reconciliation engine, a new reconciled resource object in the CMDB;

merging, by the reconciliation engine, the unreconciled resource object and the at least one resource object into the new reconciled resource object according to at least one merging rule, the unreconciled resource object and the at least one resource object being different instances of a common resource object; and storing, by the reconciliation engine, the new reconciled resource object in a reconciled dataset of the CMDB.

2. The method of claim 1, further comprising:
assigning, by the reconciliation engine, a reconciliation identifier to the new reconciled resource object, the reconciliation identifier being a reconciliation identifier that was assigned to the at least one resource object.

3. The method of claim 1, wherein the unreconciled resource object is from a first source, wherein the matching includes matching, by the reconciliation engine, the unreconciled resource object from the first source with a resource object from a second source and a resource object from a third source.

4. The method of claim 1, wherein the first identification rule specifies a combination of attributes when determining a match.

5. The method of claim 1, wherein the matching includes:
determining, by the reconciliation engine, that the unreconciled resource object includes at least one sub-object; and
querying, by the reconciliation engine, the CMDB to determine whether the at least one sub-object matches with another resource object stored in the CMDB.

6. The method of claim 1, wherein the merging includes:
assigning, by the reconciliation engine, a weight value to an attribute of the unreconciled resource object, and assigning, by the reconciliation engine, a weight value to an attribute of the at least one resource object, the attribute of the unreconciled resource object having a first value, the attribute of the at least one resource object having a second value;
selecting, by the reconciliation engine, one of the first value and the second value based on the assigned weight values; and associating, by the reconciliation engine, the selected one of the first value and the second value to a corresponding attribute in the new reconciled resource object.

7. The method of claim 6, wherein the selecting includes selecting the first value when the weight value of the attribute of the unreconciled resource object is higher than the weight value of the attribute of the at least one resource object.

8. The method of claim 1, wherein the merging includes merging attributes from the unreconciled resource object with attributes of the at least one resource object according to an attribute weight assignment algorithm or an attribute value selection algorithm.

9. A non-transitory computer-readable medium storing executable instructions that, when executed by at least one processor, cause a reconciliation engine to:
receive, via an application programming interface (API) of a configuration management database (CMDB), a plurality of unreconciled resource objects from one or more data sources, each of the plurality of unreconciled resource objects representing a component of a computer system, the component of the computer system including a device, switch, router, memory, software application, or operating system;
select an unreconciled resource object from the plurality of unreconciled resource objects;
query the CMDB to determine whether the unreconciled resource object matches with at least one resource object stored in the CMDB according to at least one of a plurality of identification rules, each of the plurality of identification rules specifying which attributes are considered when determining a match during a reconciliation process, the plurality of identification rules including a first identification rule and a second identification rule, wherein the match operation includes applying the first identification rule and the second identification rule in a defined order such that, when the first identification rule does not result in a match during the reconciliation process, the second identification rule is applied during the reconciliation process;
create a new reconciled resource object in the CMDB;
merge the unreconciled resource object and the at least one resource object into the new reconciled resource object according to at least one merging rule, the unreconciled resource object and the at least one resource object being different instances of a common resource object; and
store the new reconciled resource object in a reconciled dataset of the CMDB.

10. The non-transitory computer-readable medium of claim 9, wherein the executable instructions cause the reconciliation engine to:
assign a reconciliation identifier to the new reconciled resource object, the reconciliation identifier being a reconciliation identifier that was assigned to the at least one resource object.

11. The non-transitory computer-readable medium of claim 9, wherein the unreconciled resource object is from a first source, wherein the executable instructions cause the reconciliation engine to match the unreconciled resource object from the first source with a resource object from a second source and a resource object from a third source.

12. The non-transitory computer-readable medium of claim 9, wherein the first identification also specifies a type of resource object to which the first identification rule applies and a source to which the first identification rule applies.

13. The non-transitory computer-readable medium of claim 9, wherein the first identification rule specifies first attributes when determining a match, and the second identification rule specifies second attributes when determining a match, the second attributes being different from the first attributes.

14. The non-transitory computer-readable medium of claim 9, wherein the executable instructions cause the reconciliation engine to:
determine that the unreconciled resource object includes at least one sub-object;
query the CMDB to determine whether the at least one sub-object matches with another resource object stored in the CMDB.

15. The non-transitory computer-readable medium of claim 9, wherein the executable instructions cause the reconciliation engine to:
assign a weight value to an attribute of the unreconciled resource object, and assign a weight value to an attribute of the at least one resource object, the attribute of the unreconciled resource object having a first value, the attribute of the at least one resource object having a second value;
select one of the first value and the second value based on the assigned weight values;
associate the selected one of the first value and the second value to a corresponding attribute in the new reconciled resource object.

16. The non-transitory computer-readable medium of claim 15, wherein the first value is selected over the second value when the weight value of the attribute of the unreconciled resource object is higher than the weight value of the attribute of the at least one resource object.

17. A resource management computer system comprising:
a configuration management database (CMDB) configured to store a plurality of resource objects, the plurality of resource objects including configuration items (CIs);
a database application programming interface (API) configured to receive a plurality of unreconciled resource objects from one or more data sources, each of the plurality of unreconciled resource objects representing a component of a computer system, the component of the computer system including a device, switch, router, memory, software application, or operating system; and
a reconciliation engine configured to:
select an unreconciled resource object from the plurality of unreconciled resource objects;
query the CMDB to determine whether the unreconciled resource object matches with at least one resource object stored in the CMDB according to at least one of a plurality of identification rules, each of the plurality of identification rules specifying which attributes are considered when determining a match during a reconciliation process, the plurality of identification rules including a first identification rule and a second identification rule, wherein the match operation includes applying the first identification rule and the second identification rule in a defined order such that, when the first identification rule does not result in a match during the reconciliation process, the second identification rule is applied during the reconciliation process;
assign a reconciliation identifier to the unreconciled resource object that was matched to the at least one resource object, the reconciliation identifier being a reconciliation identifier that was assigned to the at least one resource object;
create a new reconciled resource object in the CMDB;
merge resource objects having the same reconciliation identifier including merging the unreconciled resource object and the at least one resource object into the new reconciled resource object according to an least one merging rule, the unreconciled resource object and the at least one resource object being different instances of a common resource object; and
store the new reconciled resource object in a reconciled dataset of the CMDB.

18. The resource management computer system of claim 17, wherein the merge operation includes merging attributes of the unreconciled resource object with attributes of the at least one resource object according to an attribute weight assignment algorithm or an attribute value selection algorithm.

19. A method to reconcile multiple instances of a single resource object using a of a configuration management database (CMDB), the method comprising:
receiving, via an application programming interface (API), a plurality of unreconciled resource objects from one or more data sources, each of the plurality of unreconciled resource objects representing a component of a computer system, the component of the computer system including a device, switch, router, memory, software application, or operating system;
selecting, by at least one processor, an unreconciled resource object from the plurality of unreconciled resource objects;
querying, by the at least one processor, CMDB to determine whether the unreconciled resource object matches with at least one resource object stored in the CMDB according to at least one of a plurality of identification rules, each of the plurality of identification rules specifying which attributes are considered when determining a match during a reconciliation process, the plurality of identification rules including a first identification rule and a second identification rule, the matching includes applying the first identification rule and the second identification rule in a defined order such that, when the first identification rule does not result in a match during the reconciliation process, the second identification rule is applied during the reconciliation process;
assigning, by the at least one processor, a reconciliation identifier to the unreconciled resource object that was matched to the at least one resource object, the reconciliation identifier being a reconciliation identifier that was assigned to the at least one resource object;
determining, by the at least one processor, that the unreconciled resource object includes at least one sub-object, the at least one sub-object corresponding to one or more sub-components of the component of the computer system;
querying, by the at least one processor, the CMDB to determine whether the at least one sub-object matches with another resource object stored in the configuration management database;
determining, by the at least one processor, whether there are unselected resource objects to be reconciled;
creating, by the at least one processor, a new reconciled resource object in the CMDB;
selecting, by the at least one processor, a group of resource objects having the same reconciliation identifier in response to the determination that there are no unselected resource objects to be reconciled, wherein the selecting includes selecting the unreconciled resource object and the at least one resource object;

merging, by the at least one processor, attributes from the unreconciled resource object and attributes of the at least one resource object into the new reconciled resource object according to an attribute weight assignment algorithm or an attribute value selection algorithm; and associating, by the at least one processor, the new reconciled resource object in a reconciled dataset of the CMDB.

20. The method of claim 19, wherein the merging includes:

assigning, by the at least one processor, a weight value to an attribute of the unreconciled resource object;

assigning, by the at least one processor, a weight value to an attribute of the at least one resource object, the attribute of the unreconciled resource object having a first value, the attribute of the at least one resource object having a second value;

selecting, by the at least one processor, one of the first value and the second value based on the assigned weight values, wherein the selecting includes selecting the first value when the weight value of the attribute of the unreconciled resource object is higher than the weight value of the attribute of the at least one resource object; and associating, by the at least one processor, the selected one of the first value and the second value to a corresponding attribute in the new reconciled resource object.

21. The method of claim 19, wherein the first identification rule specifies first attributes to be considered when determining a match, and the second identification rule specifies second attributes to be considered when determining a match, the second attributes being different from the first attributes.

22. The method of claim 19, wherein the unreconciled resource object is from a first source, wherein the matching includes matching, by the at least one processor, the unreconciled resource object from the first source with a resource object from a second source and a resource object from a third source.

* * * * *

UNITED STATES PATENT AND TRADEMARK OFFICE
CERTIFICATE OF CORRECTION

PATENT NO. : 10,795,643 B2
APPLICATION NO. : 15/476704
DATED : October 6, 2020
INVENTOR(S) : Kumar et al.

Page 1 of 1

It is certified that error appears in the above-identified patent and that said Letters Patent is hereby corrected as shown below:

In the Claims

In Column 12, Claim 19, Line 21, delete "of" and insert -- reconciliation engine of --, therefor.

Signed and Sealed this
Nineteenth Day of January, 2021

Andrei Iancu
*Director of the United States Patent and Trademark Office*